United States Patent
Khandani et al.

(10) Patent No.: US 9,602,207 B2
(45) Date of Patent: Mar. 21, 2017

(54) SOFT DECODING OF DATA IN A COHERENT OPTICAL RECEIVER

(71) Applicant: Ciena Corporation, Hanover, MD (US)

(72) Inventors: Amir Keyvan Khandani, Kitchener (CA); Han Sun, Kanata (CA); Kim B. Roberts, Nepean (CA)

(73) Assignee: Ciena Corporation, Hanover, MD (US)

(*) Notice: Subject to any disclaimer, the term of this patent is extended or adjusted under 35 U.S.C. 154(b) by 16 days.

(21) Appl. No.: 14/227,084

(22) Filed: Mar. 27, 2014

(65) Prior Publication Data

US 2014/0212149 A1 Jul. 31, 2014

Related U.S. Application Data

(63) Continuation of application No. 12/608,022, filed on Oct. 29, 2009, now Pat. No. 8,718,491.

(51) Int. Cl.

| | |
|---|---|
| *H04B 10/25* | (2013.01) |
| *H04B 10/60* | (2013.01) |
| *H04B 10/61* | (2013.01) |
| *H04L 25/06* | (2006.01) |
| *H04B 10/2507* | (2013.01) |
| *H04L 25/03* | (2006.01) |

(52) U.S. Cl.
CPC ......... *H04B 10/2572* (2013.01); *H04B 10/60* (2013.01); *H04B 10/611* (2013.01); *H04B 10/613* (2013.01); *H04B 10/6161* (2013.01); *H04B 10/6162* (2013.01); *H04L 25/067* (2013.01); *H04L 2025/03617* (2013.01)

(58) Field of Classification Search
None
See application file for complete search history.

(56) References Cited

U.S. PATENT DOCUMENTS

| | | | |
|---|---|---|---|
| 3,820,042 A | 6/1974 | Mueller | |
| 6,038,357 A * | 3/2000 | Pan | 385/24 |
| 7,522,841 B2 | 4/2009 | Bontu et al. | |
| 7,532,822 B2 | 5/2009 | Sun et al. | |
| 7,606,498 B1 | 10/2009 | Wu et al. | |
| 7,627,252 B2 | 12/2009 | Sun et al. | |
| 7,684,712 B1 | 3/2010 | Roberts et al. | |
| 2005/0062635 A1 | 3/2005 | Franz | |
| 2006/0285852 A1* | 12/2006 | Xi et al. | 398/141 |
| 2007/0092260 A1* | 4/2007 | Bontu et al. | 398/152 |
| 2007/0220408 A1 | 9/2007 | Huggett et al. | |
| 2009/0100314 A1 | 4/2009 | Danninger et al. | |
| 2009/0148164 A1 | 6/2009 | Roberts et al. | |
| 2009/0252202 A1 | 10/2009 | Gaddam | |
| 2009/0324224 A1 | 12/2009 | Xie | |

* cited by examiner

*Primary Examiner* — Darren E Wolf
(74) *Attorney, Agent, or Firm* — Clements Bernard Walker PLLC; Christopher L. Bernard; Lawrence A. Baratta, Jr.

(57) ABSTRACT

In a coherent optical receiver receiving a polarization multiplexed optical signal through an optical communications network, a method of compensating noise due to polarization dependent loss (PDL). A Least Mean Squares (LMS) compensation block processes sample streams of the received optical signal to generate symbol estimates of symbols modulated onto each transmitted polarization of the optical signal. A decorrelation block de-correlates noise in the respective symbol estimates of each transmitted polarization and generating a set of decorrelated coordinate signals. A maximum likelihood estimator soft decodes the de-correlated coordinate signals generated by the decorrelation block.

15 Claims, 4 Drawing Sheets

SOFT DECODING OF DATA IN A COHERENT OPTICAL RECEIVER

CROSS-REFERENCE TO RELATED APPLICATIONS

This application is a Continuation of U.S. patent application Ser. No. 12/608,022, the entire content of which is hereby incorporated by reference.

MICROFICHE APPENDIX

Not Applicable.

TECHNICAL FIELD

The present invention relates to coherent optical receivers in optical communications systems, and more particularly to soft decoding of data in a coherent optical receiver.

BACKGROUND OF THE INVENTION

FIG. 1 illustrates an optical communications system including a transmitter 1, an optical fiber link 5 and a coherent optical receiver known, for example, from Applicant's co-pending U.S. patent application Ser. No. 11/551,367 filed Oct. 20, 2006 which issued to U.S. Pat. No. 7,684,712 on Mar. 23, 2010, U.S. patent application Ser. Nos. 11/315,342 and 11/315,345, both of which were filed Dec. 23, 2005 and which issued to U.S. Pat. No. 7,627,252 on Dec. 1, 2009 and U.S. Pat. No. 7,532,822 on May 12 2009, and U.S. patent application Ser. No. 11/950,585 filed Dec. 5, 2007 which issued to U.S. Pat. No. 8,005,368 on Aug. 23, 2011. The transmitter 1 may operate in the manner closely similar to that known, for example, from U.S. Pat. No. 7,382,985, which issued Jun. 3, 2008. The entire contents of U.S. patent application Ser. Nos. 11/551,367, 11/315,342, 11/315,345 and 11/950,585 are incorporated herein by reference.

As may be seen in FIG. 1, an inbound optical signal is received through the optical link 2, split into orthogonal received polarizations polarization signals (X and Y) by a Polarization Beam Splitter 4, and then mixed with a Local Oscillator (LO) signal 6 by a conventional 90° optical hybrid 8. The composite optical signals emerging from the optical hybrid 8 are supplied to respective photodetectors 10, which generate corresponding analog electrical signals. The photodetector signals are sampled by respective Analog-to-Digital (A/D) converters 12 to yield raw multi-bit digital signals $I_X$, $Q_X$ and $I_Y$, $Q_Y$ corresponding to In-phase (I) and Quadrature (Q) components of each of the received polarizations (X, Y).

From the A/D converter 12 block, the respective n-bit signals $I_X$, $Q_X$ and $I_Y$, $Q_Y$ of each received polarization are supplied to an agile signal equalizer 14 which operates to compensate chromatic dispersion and polarization rotation impairments. In general, the signal equalizer 14 comprises a respective dispersion compensation block 16 for each of the X- and Y-polarizations, and a polarization compensation block 18. The dispersion compensation blocks 16 have a width sufficient to enable compensation of moderate-to-severe dispersion (e.g. on the order of 10000 ps/nm) based on a set of dispersion compensation coefficients 20, and generate respective intermediate vectors $\{T^A{}_X\}$ and $\{T^A{}_Y\}$. These intermediate vectors $\{T^A{}_X\}$ and $\{T^A{}_Y\}$ are then input to the polarization compensation block 18, which uses a set of polarization compensation vectors $H_{XX}$, $H_{XY}$, $H_{YY}$ and $H_{YX}$ to impose a phase rotation which compensates polarization impairments of the optical signal, and so de-convolve the transmitted symbols from the raw digital sample streams $I_X$, $Q_X$, and $I_Y$, $Q_Y$ generated by the A/D converters 12. The compensated signals 22 output from the equalizer 14 represent multi-bit estimates X'(n) and Y'(n) of the symbols encoded on each transmitted polarization of the received optical signal. These symbol estimates X'(n), Y'(n), are supplied to a carrier recovery block 24 for LO frequency control, symbol detection and data recovery, such as described in Applicant's co-pending U.S. patent application Ser. No. 11/366,392 filed Mar. 2, 2006.

The recovered data 26 output from the carrier recovery block 24 comprises respective decision values X(n), Y(n) of the symbols modulated onto each transmitted polarization of the received optical signal. Note that in the present description, "n" is an index of each transmitted symbol. These decision values X(n), Y(n) are passed to respective X- and Y-polarization decoding blocks 28 (such as, for example, a Forward Error Correction (FEC) block, Viterbi decoder, Low Density Parity Check (LDPC) decoder, Turbo decoder etc.) for error correction and data recovery.

In general, the decision values 26 X(n), Y(n) output from the carrier recovery block 24 have the same format as the originally transmitted symbols modulated onto each transmitted polarization. If desired, the decision values X(n), Y(n) may be demultiplexed (or otherwise processed) to obtain a set of recovered signals corresponding to the original signals encoded in the transmitted symbols. For example, Applicant's U.S. Pat. No. 7,522,841, which issued Apr. 21, 2009, teaches an arrangement in which four parallel tributary signals are bit-wise multiplexed to yield a pair of 2-bit symbol streams. Each symbol stream is then modulated and transmitted on a respective polarization using a Quadrature Phase Shift Keying (QPSK) or Quadrature Amplitude Modulation (QAM) modulation scheme. In such a case, the decision values 26 X(n), Y(n) output by the carrier recovery block 26 would be 2-bit estimates of the symbols modulated on the respective transmitted polarization. These two-bit estimates may be decomposed to yield four parallel bit-streams respectively corresponding with the original tributary signals.

A Least Mean Squares (LMS) update block 30 computes the polarization compensation vectors $H_{XX}$, $H_{XY}$, $H_{YY}$ and $H_{YX}$ based on the intermediate vectors $\{T^A{}_X\}$ and $\{T^A{}_Y\}$, as well as symbol phase $\phi_X$, $\phi_X$ and error $e_X$, $e_Y$ information received from the carrier recovery block 24. As described in Applicant's co-pending U.S. patent application Ser. No. 11/950,585, the polarization compensation vectors $H_{XX}$, $H_{XY}$, $H_{YY}$ and $H_{YX}$ are updated at a sufficiently high rate to enable tracking, and therefore compensation, of polarization rotation transients at speeds on the order of 50 kHz.

In the coherent optical receiver of FIG. 1, polarization compensation is performed in the Jones Matrix domain using polarization compensation vectors $H_{XX}$, $H_{XY}$, $H_{YY}$ and $H_{YX}$ computed using an LMS algorithm, but other methods may equally be used. Recursive least squares, and constant modulus are two other examples of algorithms that can be used for calculation of the polarization compensation parameters. The polarization compensation can be implemented, for example, in the frequency domain, the time domain, the Jones Matrix domain, or combinations of such operations.

The coherent optical receiver of FIG. 1 is capable of data recovery from a high-speed optical signal (e.g. symbol rates above 10 Gbaud) composed of two independently modulated orthogonal polarizations, even in the presence of moderate to severe ISI due to chromatic dispersion (CD) and polarization mode dispersion (PMD), and polarization transients on the order of 50 kHz.

As will be appreciated from the above description, the decision values 26 X(n), Y(n) contain residual noise, which is intended to be compensated by the decoding block(s) 28. Under normal conditions, the polarization compensation block 18 effectively removes any correlation between the X- and Y-polarization decision values X(n), Y(n). This implies that the residual noise in the X- and Y-polarization decision values X(n), Y(n) is also un-correlated.

As is known in the art, Polarization Dependent Loss (PDL) can produce a state in which the X- and Y-polarizations of the received optical signal are not orthogonal. Under some circumstances, this can lead to a condition in which a residual noise correlation exists between the X- and Y-polarization decision values 26 X(n), Y(n). If the decoding blocks 28 are designed assuming that the noise is un-correlated, the presence of residual noise correlation can result in a performance penalty of up to about 2 dB. On the other hand, designing the decoding blocks 28 to perform error correction in the presence of noise correlation dramatically increases the complexity (and thus cost) of the decoding blocks and/or requires increased signal overhead for error correction, both of which are undesirable.

SUMMARY OF THE INVENTION

An aspect of the present invention provides a coherent optical receiver for receiving an optical signal through an optical communications network. A polarization compensation block processes sample streams of the received optical signal to generate symbol estimates of symbols modulated onto the optical signal. A decorrelation block at least partially de-correlates noise in the respective symbol estimates of each transmitted polarization and for generating a set of decorrelated coordinate signals. Finally, an estimator decodes de-correlated coordinate signals generated by the decorrelation block.

An advantage of the present invention is that residual noise correlation between X- and Y-polarization symbol estimates can be reduced, and Signal-to-Noise Ratio improved.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
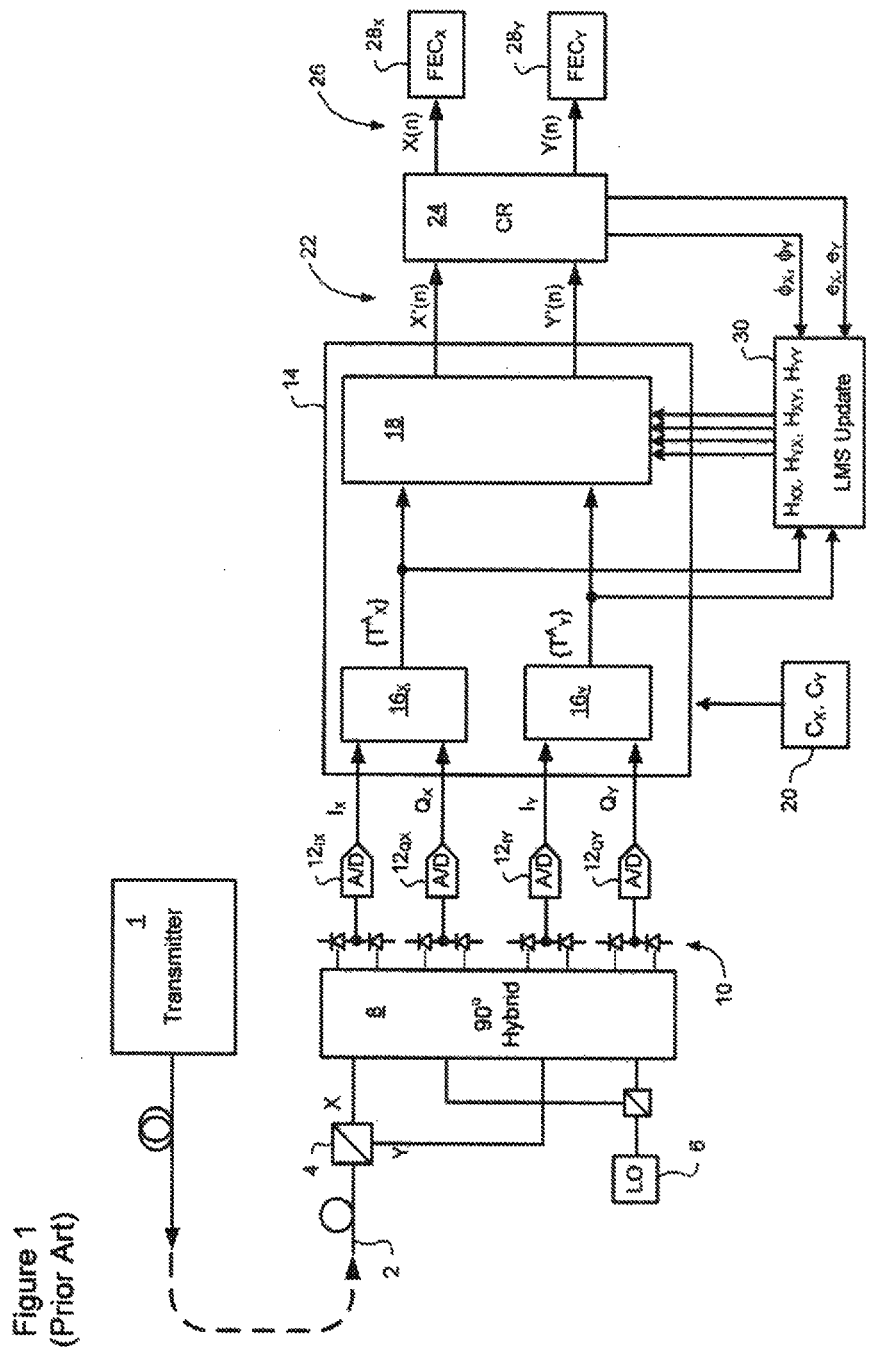
FIG. 1 is a block diagram schematically illustrating an optical communications system including a transmitter and a coherent optical receiver known from Applicant's co-pending U.S. patent application Ser. No. 11/551,367.

The present invention provides a method and system for compensating Polarization Dependent Loss (PDL) in a coherent optical receiver of the type described above with reference to FIG. 1. A representative embodiment of the present invention is described below with reference to FIGS. 2-4.

As noted above, Polarization Dependent Loss (PDL) can cause a condition in which residual noise correlation exists between the X- and Y-polarization decision values 26 X(n), Y(n) generated by the carrier recovery block 24. In very general terms, the present invention exploits this noise correlation to both de-correlate the noise and improve the signal to noise ratio (SNR) in the decision values 26 X(n), Y(n). During periods of rapidly changing PDL, the effect of this technique may be very low, but it will not further degrade the SNR. However, when PDL is slowly changing or constant, the present technique can yield as much as about 1.4 dB improvement in SNR.

For the purposes of the present disclosure, it is convenient to consider the transmitted optical signal as a multi-dimensional symbol space comprising four orthogonal coordinates plus time. The four orthogonal coordinates comprise the respective real (In-phase) and imaginary (Quadrature) components of each of the transmitted X and Y polarisations. For notation purposes, the four coordinates may be denoted as XI, XQ, YI, and YQ, respectively, and signals of each coordinate may be denoted using the coordinate indicator as a subscript.

Within any given time interval (baud), data can be independently modulated onto any one or more of the four coordinates. Thus, a transmitted symbol can be represented as a constellation of between one and four coordinates, all of which are modulated onto the optical signal within a single time interval. The number of coordinates in a symbol/constellation is determined by the number of polarizations used and the number of components of each polarization used by the modulation scheme. The number of possible constellations is determined by the number of coordinates used in the symbol/constellation and the number of discrete values that each coordinate can assume, given the chosen modulation scheme. For example, a Binary Phase Shift Keying (BPSK) modulation scheme uses only one (typically the real) component of a given polarization. In a dual polarization system, both polarizations are used, so that each symbol will comprise a constellation of two coordinates, each of which can assume nominal values of either −1 or +1 at the transmitter. This means that there are a total of four possible constellations. QPSK and QAM modulation schemes use both of the I and Q components of a given polarization. In a dual polarization system, both polarizations are used, so that each symbol will comprise a constellation of four coordinates, each of which can assume nominal values of either −1 or +1 at the transmitter. This means that there are a total of 16 possible constellations. 16-QAM modulation also uses both components on each polarization, but in this case each coordinate can assume nominal values of −3, −1, +1 or +3 at the transmitter. In a dual-polarization system, this means that each 16-QAM symbol will comprise a constellation of four coordinates, and there are a total of 256 possible constellations. Note that other modulation schemes may equally be used. Frequency domain, sub-carrier or other modulation methods can be used to modulate symbols/constellations onto the optical signal.

In the receiver described above with reference to FIG. 1, each decision value X(n), Y(n) represents an estimate of the constellation coordinates modulated onto the corresponding polarization during a given time interval, denoted by (n). As such, these decision values can be readily decomposed into the appropriate coordinate signals, in accordance with the known modulation scheme implemented in the transmitter. Thus, for example, in the case of QPSK, QAM and 16-QAM modulation schemes, the decision values X(n), Y(n) can be decomposed into four coordinate signals (denoted herein as $S_{XI}(n)$, $S_{XQ}(n)$, $S_{YI}(n)$, and $S_{YQ}(n)$) each of which represents an estimate of the nominal value assumed by the corresponding coordinate at the transmitter during the $n^{th}$ time interval.

For convenience of description, examples are used in which each transmitted symbol comprises a constellation of between one and four coordinates, all of which are modulated onto the optical signal within a single time interval, denoted by (n). However, it will be appreciated that this is not essential. In principle, a 4N-dimensional symbol can be transmitted by modulating a respective set of four coordinates onto the optical signal during each of N successive time intervals.

A signal processing block designed to process two dimensions together is referred to herein as a two-dimensional (2D) processing block. Similarly, a signal processing block designed to process all four dimensions together is referred to herein as a four-dimensional (4D) processing block.

As is known in the art, light propagating through an optical fibre link experiences a polarization rotation and PDL. The polarization rotation can be represented using a Jones Matrix of the form:

$$PDL = J(\theta, \phi) * G_{PDL} = \begin{bmatrix} \cos(\theta)e^{-j\phi} & -\sin(\theta) \\ \sin(\theta) & \cos(\theta)e^{+j\phi} \end{bmatrix} * \begin{bmatrix} \frac{1}{\alpha} & 0 \\ 0 & \frac{1}{\beta} \end{bmatrix}$$

Where $\alpha$ and $\beta$ are the respective gains of the PDL principal axes of the link; $\theta$ is the angle between the transmit polarization vector and the principal axes of the link PDL; and $\phi$ determines the shape of the elliptical polarization of the principal axes of the link PDL. When $\phi=0$, the launched optical signal is linearly polarized; and when $\phi=\pi/2$, the launched optical signal is circularly polarized.

Noise introduced into the optical signal, at some point along the link, is subject to only the PDL in the downstream portion of the link, which can be represented in this same manner. For the case of noise PDL, the angles $\theta$ and $\phi$ are denoted herein as $\theta_N$ and $\phi_N$, and the gain parameters $\alpha_N$ $\beta_N$ to distinguish them from the total PDL traversed by the optical signal launched by the transmitter.

As will be appreciated, the total noise at the receiver can be considered to be made up of multiple noises, each of which has experienced a different amount of PDL in dependence on the portion of the link traversed by the noise before it reached the receiver. Because the polarization compensation block 18 compensates polarization effects of the entire link, the PDL experienced by the noise is effectively over-compensated. It is this over-compensation of the noise PDL that leads, under some circumstances, to the residual noise correlation in the decision values 26 X(n) and Y(n) output by the carrier recovery block 24.

For the purpose of compensating the residual noise correlation it is useful to consider the optical link as a set of sub-links, each of which extends from a respective point of injection of noise to the receiver. Each sub-link can therefore be modeled using the matrix form provided above, and noise injected at that point can be defined as having respective values of $\theta_N$ and $\phi_N$. An approximation of the total noise PDL can be representing using the same matrix form as provided above, with average values of the noise angles, which are denoted herein as $\theta_N^{Avg}$ and $\phi_N^{Avg}$.

The average noise angles $\theta_N^{Avg}$ and $\phi_N^{Avg}$ can be found from the noise power covariance, using equations of the form:

$$\theta_N^{Avg} = \frac{\text{sign}(P_{XY}^{Re})}{2} \tan^{-1}\left(\frac{2 \cdot |P_{XY}^{Re}| + |P_{XY}^{Im}|}{P_{YY} - P_{XX}}\right) \text{ and}$$

$$\phi_N^{Avg} = \tan^{-1}\left(\frac{P_{XY}^{Im}}{P_{XY}^{Re}}\right) + p \cdot \pi \begin{cases} p = 0 & \text{if}(\beta^2 - \alpha^2) \cdot \frac{1}{2} \cdot \sin(2\theta_N^{Avg}) \geq 0 \\ p = 1 & \text{if}(\beta^2 - \alpha^2) \cdot \frac{1}{2} \cdot \sin(2\theta_N^{Avg}) < 0 \end{cases}$$

Division by zero is avoided by setting $\phi_N^{Avg}=\pi/2$ in that case. The terms $P_{XY}^{Re}$ and $P_{XY}^{Im}$ are defined below.

Figure 2:
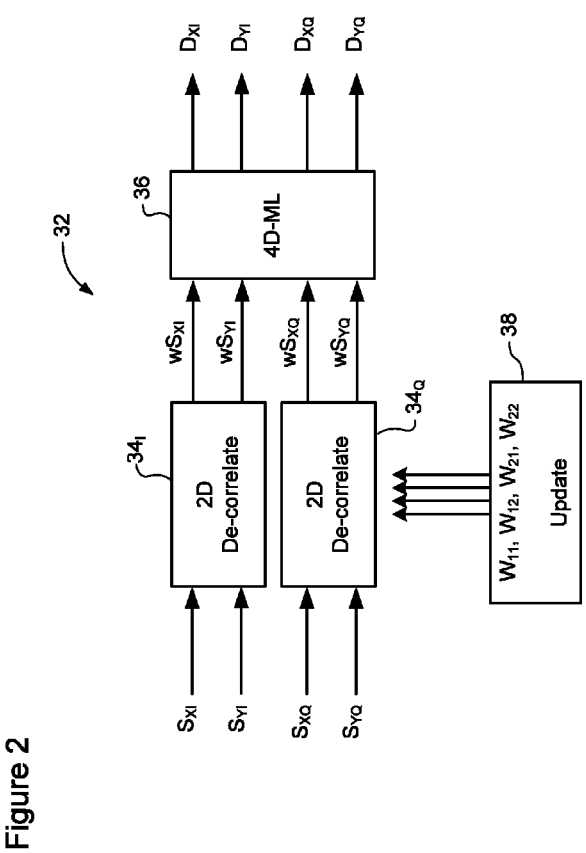
FIG. 2 is a block diagram schematically illustrating a soft decoder in accordance with a representative embodiment of the present invention.

Referring to FIG. 2, a soft decoder 32 in accordance with a representative embodiment of the present invention comprises a pair of 2D decorrelators 34 cascaded with a 4D estimator. As may be seen in FIG. 2, each decorrelator 34 receives a respective pair of coordinate signals $S_{XI}(n)$, $S_{YI}(n)$ and $S_{XQ}(n)$, $S_{YQ}(n)$ from the carrier recovery block 24, and applies a decorrelation matrix W to generate a corresponding pair of decorrelated coordinate signals $wS_{XI}(n)$, $wS_{XQ}(n)$, $wS_{YI}(n)$, and $wS_{YQ}(n)$. The decorrelation matrix W is computed by a matrix update block 38, as will be described in greater detail below. The 4D estimator 36 processes the decorrelated coordinate signals $wS_{XI}(n)$, $wS_{XQ}(n)$, $wS_{YI}(n)$, and $wS_{YQ}(n)$ together to generate corresponding soft decode signals $D_{XI}(n)$, $D_{XQ}(n)$, $D_{YI}(n)$, and $D_{YQ}(n)$, which represent the most likely estimates of the respective tributary signals modulated onto each coordinate of the transmitted optical signal. The soft decode signals $D_{XI}(n)$, $D_{XQ}(n)$, $D_{YI}(n)$, and $D_{YQ}(n)$ can be supplied to one or more conventional data recovery blocks 28 (such as, for example, Forward Error Correction (FEC) decoders, Viterbi decoders, Low Density Parity Check (LDPC) decoders, Turbo decoders etc.) for error correction and data recovery using known techniques.

Figure 3:
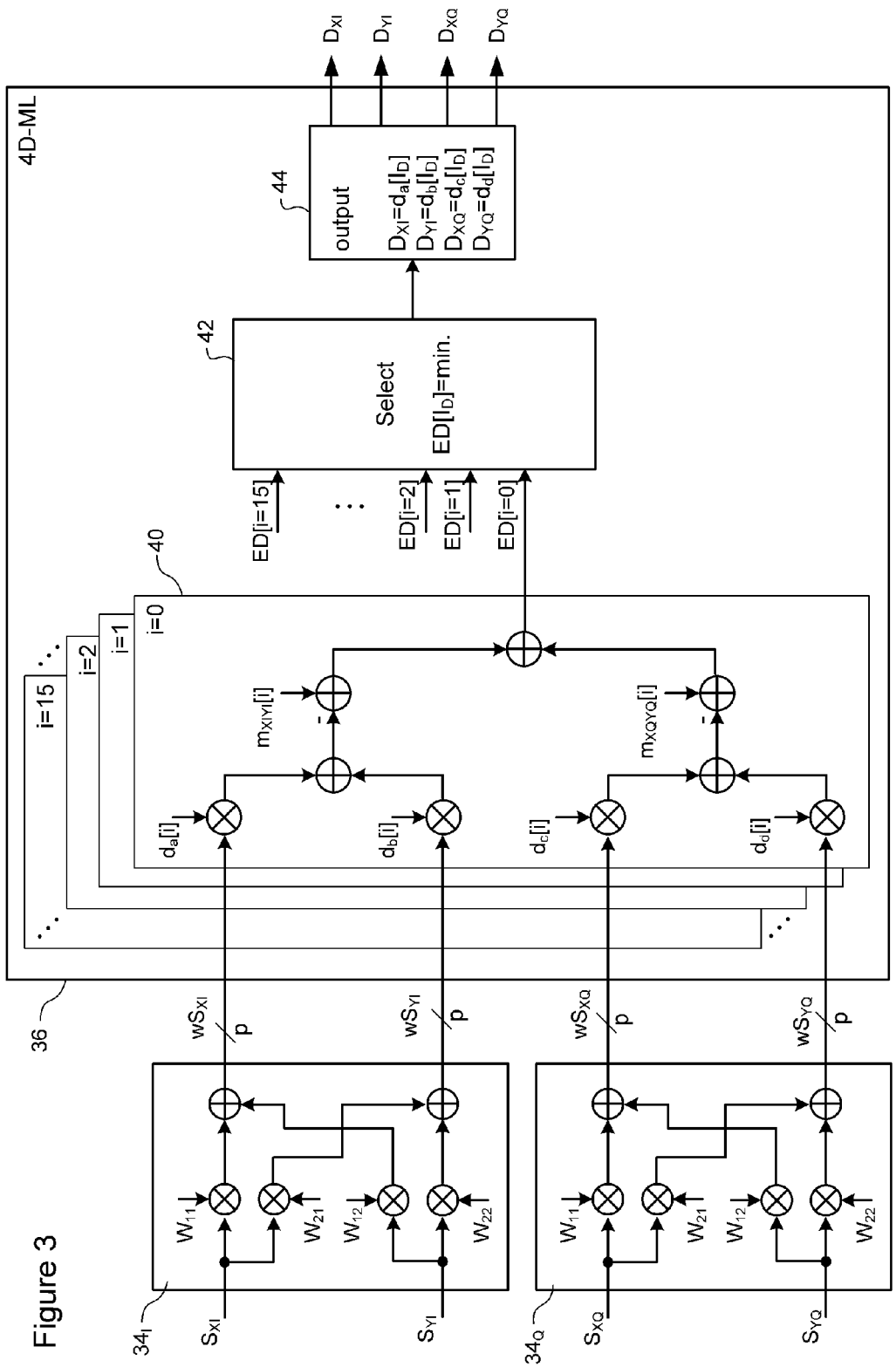
FIG. 3 is a block diagram schematically illustrating the soft decoder of FIG. 2 in greater detail.

FIG. 3 illustrates an embodiment of the soft decoder 32 of FIG. 2 in greater detail. As may be seen in FIG. 3, each decorrelator 34 performs a real-valued 2×2 matrix multiplication using the decorrelation matrix W, to generate multi-bit decorrelated coordinate signals $wS_{XI}(n)$, $wS_{XQ}(n)$, $wS_{YI}(n)$, and $wS_{YQ}(n)$. In some embodiments, each of the decorrelated coordinate signals has a resolution of p=8 bits, but more or fewer bits resolution may be used if desired. The estimator 36 processes the decorrelated coordinate signals to determine the most likely transmitted constellation, and outputs a set of soft decode signals $D_{XI}(n)$, $D_{XQ}(n)$, $D_{YI}$, and $D_{YQ}(n)$ corresponding to the nominal values of the identified constellation.

As will be appreciated, both the number of possible constellations, and their nominal values, are known in advance from the number of polarizations used and the modulation format used to generate the optical signal at the transmitter. The embodiment of FIGS. 2 and 3 is particularly suitable for the case of QPSK modulation format on both transmitted polarizations. As noted above, this scenario yields a total of 16 unique constellations, which may be identified as $D[i]=\{d_{XI}[i], d_{XQ}[i], d_{YI}[i], d_{YQ}[i]\}$, i=0 ... 15.

In general, the 4D estimator 36 can be a maximum likelihood (ML) estimator, implementing any suitable maximum likelihood algorithm known in the art for identifying the most likely transmitted constellation given the decorrelated coordinate signals $wS_{XI}(n)$, $wS_{XQ}(n)$, $wS_{YI}(n)$, and wS$_{YQ}$(n) generated by the decorrelators 34. For example, a Euclidean Distance between the decorrelated coordinate signals wS$_{XI}$(n), wS$_{XQ}$(n), wS$_{YI}$(n), and wS$_{YQ}$(n) and each possible constellation can be computed, and the constellation associated with the smallest Euclidean Distance selected as the most likely transmitted constellation. However, in many cases an approximation to a complete Maximum Likelihood algorithm can be successfully implemented and achieve satisfactory results.

Figure 4:
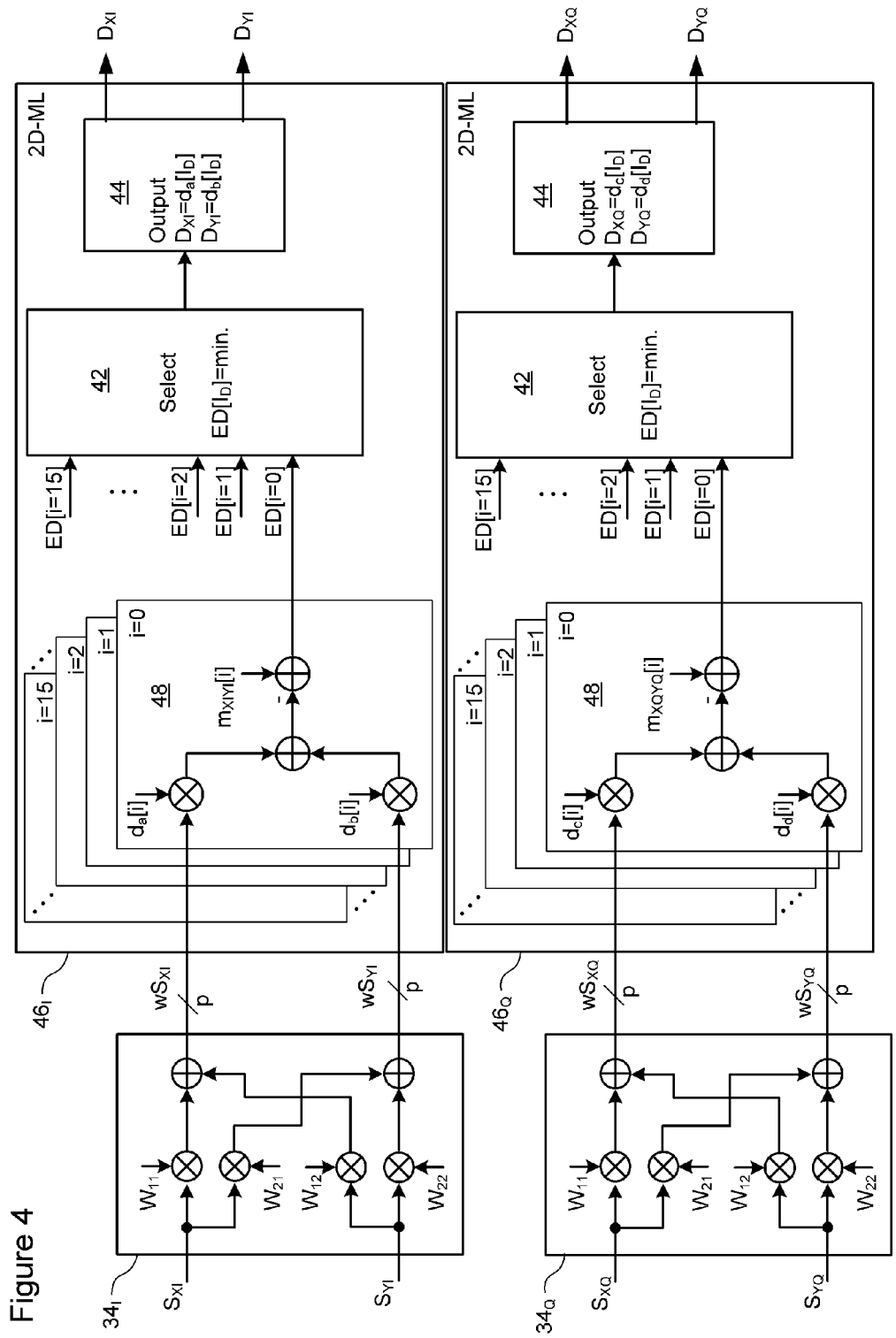
FIG. 4 is a block diagram schematically illustrating a soft decoder in accordance with a second representative embodiment of the present invention.

For example, in the embodiment of FIG. 3, the 4D estimator 36 implements a simplified approximation of the above-noted Euclidean Distance algorithm which reduces the cost of the associated circuitry while still yielding satisfactory results. The estimator 36 operates by computing a Euclidean distance ED[i] between each constellation D[i] and the decorrelated coordinate signals wS$_{XI}$(n), wS$_{YQ}$(n), wS$_{YI}$(n), and wS$_{YQ}$(n) computed by the 2D decorrelators. The constellation D[i=I$_D$] for which the Euclidean distance ED[I$_D$] is the smallest value (that is, ED[I$_D$]=min) is selected, and its respective terms {d$_{XI}$[I$_D$], d$_{XQ}$[I$_D$], d$_{YI}$[I$_D$], d$_{YQ}$[I$_D$]} output as the soft decode signals D$_{XI}$(n), D$_{XQ}$(n), D$_{YI}$(n), and D$_{YQ}$(n). In the embodiment of FIG. 4, the Euclidian distance calculation block comprises a set of 16 parallel multiplier blocks 40, each of which computes a Euclidian distance ED[i], between the decorrelated coordinate signals wS$_{XI}$(n), wS$_{XQ}$(n), wS$_{YI}$(n), and wS$_{YQ}$(n) and a respective one of the 16 constellations D[i], i=0 . . . 15. A selector block 42 receives each of the computed Euclidean Distances, and identifies the constellation D[i=I$_D$] for which the Euclidean distance ED [I$_D$] is the smallest value. An output block 44 then outputs the terms of the identified constellation D[i=I$_D$] as the soft decode signals D$_{XI}$(n), D$_{XQ}$(n), D$_{YI}$(n), and D$_{YQ}$(n).

If desired, the estimator 36 may also compute a soft metric r(n), which reflects a degree of confidence in the soft decode signals D$_{XI}$(n), D$_{XQ}$(n), D$_{YI}$(n), and D$_{YQ}$(n). This soft metric may be either calculated for the entire symbol/constellation, alternatively a respective soft metric may be computed for each soft decode signal. In some embodiments, the soft metric r(n) is a log likelihood ratio, known in the art. Alternatively, an approximation of the log likelihood ratio may be used.

For example, a respective soft metric r$_{XI}$(n) can be computed for the soft decode signal D$_{XI}$(n) as follows. As noted above, the soft decode signal D$_{XI}$(n) is chosen as the respective component d$_{XI}$[i] of the constellation D[i=I$_D$] for which ED[I$_D$]=min. Within the set of constellations D[i], i= 0 . . . 15, there is a sub-set of constellations D'[j], j=0 . . . 7 in which the corresponding component value d$_{XI}$[j] differs from D$_{XI}$(n). The respective Euclidean distances ED[j] of each of the constellations within this subset can then be analysed to identify the constellation D'[j=I$_C$] for which the Euclidean distance ED[I$_C$] is the smallest value within the subset. The soft metric r$_{XI}$(n) can then be computed as the difference between ED[I$_D$] and ED[I$_C$]. A directly similar approach can be used to compute respective soft metrics for each of the other soft decode signals D$_{XQ}$(n), D$_{YI}$(n), and D$_{YQ}$(n).

In the embodiment of FIGS. 3 and 4, the decorrelation matrix W is a 2×2 real-valued matrix which is computed by the update block to decorrelate noise in the X- and Y-polarization decision values 26 X(n), Y(n) generated by the carrier recovery block 24. In some embodiments, the received optical signal is known to contain Synch bursts comprising a sequence of known bits (or symbols) at known intervals. In such cases, the decorrelation matrix W can be updated during a period of $2^M$ Synch bursts, using the known bit (or symbol) sequence of each Synch burst. In some embodiments, the parameter value M may have a value of between 4 and 24. In some embodiments, the value of M is selected to obtain a desired update frequency. For example, for an optical signal having a given Synch burst frequency, M may be selected to obtain an update frequency of 300 KHz.

In some embodiments, the decorrelation matrix W is computed using noise power P$_X$ and noise power covariance P$_{XY}$ data for each of the four dimensions of the received optical signal. For example, the average noise power on the XI dimension can be calculated as:

$$P_{XI} = \left(\frac{2^{-M}}{K}\sum_{k=0}^{K}\sum_{m=0}^{2^M} e_{XI}^2\right) - O_{XI}^2$$

where K is the number of bits (symbols) in each Synch burst; e$_{XI}$ is the error between each XI coordinate signal S$_{XI}$(n) output from the carrier recovery block 24 and its corresponding known coordinate value of the Synch burst; and O$_{XI}$ is a direct current (DC) offset in the XI coordinate signal S$_{XI}$(n) output from the carrier recovery block 24 during each Synch burst.

In some embodiments, the offset O$_{XI}$ is calculated as:

$$O_{XI} = \frac{\sum_{k=0}^{K-1}\sum_{m=0}^{2^M-1} \text{SYNCH}_{XI}[k,m]}{K \cdot 2^M} + \text{correction}_{XI}$$

where SYNCH$_{XI}$ is the XI dimension of the received synch burst. Correction$_{XI}$ is a multibit (eg 7 bit) value of an expected offset of the SYNCH pattern in the XI dimension. Closely similar formulations can be used to compute the average noise power on each of the XQ, YI and XQ dimensions.

Using the above formulation for the noise power, the real covariances for the X and Y polarizations can be calculated as $$P_{YIXI} = \left(\frac{2^{-M}}{K}\sum_{k=0}^{K}\sum_{m=0}^{2^M} e_{YI} * e_{XI}\right) - O_{YI} * O_{XI}$$

$$P_{YQXQ} = \left(\frac{2^{-M}}{K}\sum_{k=0}^{K}\sum_{m=0}^{2^M} e_{YQ} * e_{XQ}\right) - O_{YQ} * O_{XQ} \text{ and}$$

$$P_{XY}^{Re} = P_{XIYI} + P_{XQYQ}$$

and the imaginary covariances for the X and Y polarizations can be calculated as $$P_{XQYI} = \left(\frac{2^{-M}}{K}\sum_{k=0}^{K}\sum_{m=0}^{2^M} e_{XQ} * e_{YI}\right) - O_{XQ} * O_{YI}$$

$$P_{XIYQ} = \left(\frac{2^{-M}}{K}\sum_{k=0}^{K}\sum_{m=0}^{2^M} e_{XI} * e_{YQ}\right) - O_{XI} * O_{YQ} \text{ and}$$

$$P_{XY}^{Re} = P_{XIYI} + P_{XQYQ}$$

A real-value covariance matrix P' can then be defined as:

$$P' = \begin{vmatrix} P_{XX} & P_{XY}^{Re} \\ P_{XY}^{Re} & P_{YY} \end{vmatrix},$$

where P$_{XX}$=P$_{XI}$+P$_{XQ}$, and P$_{YY}$=P$_{YI}$+P$_{YQ}$. The real-valued decorrelation matrix W can then be formulated as $$W = \begin{vmatrix} P_{YY} + \sqrt{\det(P')} & -P_{XY}^{Re} \\ -P_{XY}^{Re} & P_{XX} + \sqrt{\det(P')} \end{vmatrix}$$

Where det(P') is the determinant of P'. In some embodiments, the covariance matrix P' can be scaled such that det(P')=1, in which case the real-valued decorrelation matrix W can then be formulated as $$W = \begin{vmatrix} P_{YY} + 1 & -P_{XY} \\ -P_{XY} & P_{XX} + 1 \end{vmatrix}$$

In the embodiment of FIGS. 2 and 3, a pair of parallel 2D decorrelators 34 are used, each of which applies a 2×2 real-valued decorrelation matrix W to decorrelate corresponding In-phase and Quadrature coordinate signals S from each polarization. In principal, a single 4D decorrelator implementing a 4×4 complex decorrelation matrix W could receive all four coordinate signals S and compute the corresponding multi-bit decorrelated signals wS, possibly with increased accuracy. However, it has been found that satisfactory decorrelation performance can be achieved, at lower cost, by applying a real-valued 2×2 decorrelation matrix W to each of the In-phase and Quadrature coordinate signals separately, as shown in FIGS. 2 and 3. With this arrangement, optimum decorrelation performance is obtained when the average noise angles $\theta_N^{Avg}=\pi/4$ and $\phi_N^{Avg}=0$, and degrades with variance from that point. For values of $\phi_N^{Avg}$ far away from zero, the performance will degrade moderately compared to an embodiment using a full complex decorrelation matrix W. For values of $\theta_N^{Avg}$ near to zero (or equivalently 90 degrees), the decorrelation matrix becomes ineffective. However, the embodiment of FIGS. 2 and 3 will not make the PDL worse than doing nothing with non-ideal polarization orientations, it just will not optimally mitigate the complex noise correlations.

Based on the foregoing, it will be seen that performance can be optimized by controlling the polarization angles of the transmitted optical signal in such a manner as to minimize the absolute value of $\phi_N^{Avg}$ and keep $\theta_N^{Avg}$ near to 45 degrees. As noted above, the average noise angles $\phi_N^{Avg}$ and $\theta_N^{Avg}$ can be computed from the noise power covariances. This information can be sent to a transmitter and used to control the polarization state of the transmitted optical signal. Feed-back control techniques for controlling the polarization state of a transmitted optical signal, based on a feedback signal sent to the transmitter from a receiver, are known, for example, from U.S. Pat. No. 7,382,985, which issued Jun. 3, 2008. Typically, these techniques are designed to control the launch polarization state in such a way as to minimize polarization dependent effects (including PDL) experienced by the signal, for example by maintaining the launch polarization angle θ at 45° with respect to the principal axes of the PDL in optical fibre link. In the present case, this operation is modified, such that the launch polarization angle θ is controlled to yield $\theta_N^{Avg}=45°$, and $\phi_N^{Avg}$ minimized. Controlling the launch polarization state in this matter means that the optical signal received at the receiver will contain significant uncompensated PDL. However, the polarization compensation block 18 of the receiver (FIG. 1) can compensate this PDL, so its presence in the received optical signal does not seriously impair performance.

As noted above, the embodiment of FIGS. 2 and 3 is particularly suited for the case of QPSK modulation format on both transmitted polarizations. In principle this same architecture could also be used to process signals in which a 16-QAM modulation format on both transmitted polarizations. However, in this case a 4D ML estimator 36 would required 256 parallel multiplier blocks 40 in order to compute the Euclidian distance between each constellation D[i], i=0 . . . 255, and the decorrelated coordinate signals wS$_{XI}$(n), wS$_{XQ}$(n), wS$_{YI}$(n), wS$_{YQ}$(n). A less expensive solution, which also has been found to yield satisfactory performance, is illustrated in FIG. 4.

As may be seen in FIG. 4, the 4D ML estimator 36 of FIGS. 2 and 3 is replaced by a pair of parallel 2D ML estimators 46 for processing respective pairs of the decorrelated coordinate signals wS$_{XI}$(n), wS$_{YI}$(n), and wS$_{XQ}$(n), wS$_{YQ}$(n). With this arrangement, the In-phase (real) and Quadrature (imaginary) coordinates are treated separately, and the number of possible constellations for each coordinate pair is 16. Accordingly, each 2D ML estimator 46 comprises a set of 16 parallel multiplier blocks 48, each of which computes the Euclidian distance ED[i], between a respective one of the 16 constellations D[i], i=0 . . . 15 and one pair of the decorrelated coordinate signals. A selector block 42 receives each of the computed Euclidean Distances and identifies the constellation D[i=I$_D$] for which the Euclidean distance ED[I$_D$] is the smallest value, and the output block 44 then outputs the applicable terms of the identified constellation as the soft decode signals D$_{XI}$, D$_{XQ}$, D$_{YI}$, and D$_{YQ}$.

The embodiment(s) of the invention described above is(are) intended to be exemplary only. The scope of the invention is therefore intended to be limited solely by the scope of the appended claims.

We claim:

1. A method of compensating polarization dependent loss (PDL) in an optical communications network comprising a transmitter and a coherent optical receiver, the method comprising:
    transmitting, by the transmitter, an optical signal having a controllable polarization state, the optical signal carrying symbols modulated onto two orthogonal transmitted polarizations;
    receiving, by the coherent optical receiver, the optical signal and processing orthogonal polarizations of the received optical signal to recover symbol estimates of the symbols modulated onto the two orthogonal transmitted polarizations;
    computing from the symbol estimates, by the coherent optical receiver, an estimate representative of a noise polarization dependent loss of the received optical signal;
    transmitting, by the coherent optical receiver, the computed estimate to the transmitter;
    controlling, by the transmitter, the polarization state using the computed estimate; and
    applying, by a decorrelation block of the coherent optical receiver, a decorrelation matrix to the symbol estimates to generate a set of decorrelated signals corresponding to the symbol estimates, thereby reducing a noise correlation that is a correlation between noise in the symbol estimates of the symbols modulated onto a first of the orthogonal transmitted polarizations and noise in the symbol estimates of the symbols modulated onto a second of the orthogonal transmitted polarizations.

2. The method as claimed in claim 1, wherein the computed estimate of the noise polarization dependent loss comprises a first noise angle $\theta_N$ representative of an angle of the noise polarization dependent loss principal axis, and a second noise angle $\phi_N$ representative of a shape of an elliptical polarization of the noise polarization dependent loss.

3. The method as claimed in claim 2, wherein controlling the polarization state comprises adjusting an angle of a principal polarization axis of the transmitted optical signal based on the first noise angle $\theta_N$.

4. The method as claimed in claim 1, wherein the transmitter modulates a symbol onto four coordinates of the optical signal.

5. The method as claimed in claim 2, wherein controlling the polarization state comprises adjusting a shape of an elliptical polarization state of the transmitted optical signal based on the second noise angle $\phi_N$.

6. The method as claimed in claim 2, wherein controlling the polarization state comprises adjusting first and second polarization angles of the transmitted optical signal so as to keep the first noise angle $\theta_N$ near 45 degrees and to minimize an absolute value of the second noise angle $\phi_N$.

7. The method as claimed in claim 1, wherein the method further comprises a 4-dimensional maximum likelihood estimator identifying one of a set of predetermined constellations that most closely matches the decorrelated signals.

8. The method as claimed in claim 7, wherein identifying one of the set of predetermined constellations comprises:
  computing a respective Euclidean distance between the decorrelated signal and each of the set of predetermined constellations; and
  selecting the constellation for which the respective Euclidean distance is a minimum, each term of the selected constellation being output from the 4-dimensional maximum likelihood estimator as a respective soft-decoded coordinate signal.

9. A system for compensating polarization dependent loss (PDL) in an optical communications network, the system comprising:
  a transmitter configured to transmit an optical signal having a controllable polarization state, the optical signal carrying symbols modulated onto two orthogonal transmitted polarizations; and
  a coherent optical receiver configured to receive the optical signal and to process orthogonal polarizations of the received optical signal to recover symbol estimates of the symbols modulated onto the two orthogonal transmitted polarizations, the coherent optical receiver comprising:
    a matrix update block configured to compute a decorrelation matrix and to compute from the symbol estimates an estimate representative of a noise polarization dependent loss of the received optical signal;
    a feedback mechanism to transmit the computed estimate to the transmitter; and
    a decorrelation block configured to apply the decorrelation matrix to the symbol estimates to generate a set of decorrelated signals corresponding to the symbol estimates, thereby reducing a noise correlation that is a correlation between noise in the symbol estimates of the symbols modulated onto a first of the orthogonal transmitted polarizations and noise in the symbol estimates of the symbols modulated onto a second of the orthogonal transmitted polarizations;
  the transmitter being further configured to control the polarization state using the computed estimate.

10. The system as claimed in claim 9, wherein the computed estimate of the noise polarization dependent loss comprises a first noise angle $\theta_N$ representative of an angle of the noise polarization dependent loss principal axis, and a second noise angle $\phi_N$ representative of a shape of an elliptical polarization of the noise polarization dependent loss.

11. The system as claimed in claim 10, wherein controlling the polarization state comprises adjusting an angle of a principal polarization axis of the transmitted optical signal based on the first noise angle $\theta_N$.

12. The system as claimed in claim 9, wherein the transmitter modulates a symbol onto four coordinates of the optical signal.

13. The system as claimed in claim 10, wherein controlling the polarization state comprises adjusting first and second polarization angles of the transmitted optical signal so as to keep the first noise angle $\theta_N$ near 45 degrees and to minimize an absolute value of the second noise angle $\phi_N$.

14. The system as claimed in claim 9, wherein the coherent optical receiver further comprises a 4-dimensional maximum likelihood estimator configured to identify one of a set of predetermined constellations that most closely matches the decorrelated signals.

15. The system as claimed in claim 14, wherein the 4-dimensional maximum likelihood estimator is configured to identify one of the set of predetermined constellations by:
  computing a respective Euclidean distance between the decorrelated signal and each of the set of predetermined constellations; and
  selecting the constellation for which the respective Euclidean distance is a minimum, and outputting each term of the selected constellation as a respective soft-decoded coordinate signal.

* * * * *